United States Patent Office 3,689,469
Patented Sept. 5, 1972

3,689,469
COPOLYMERS OF VINYL ALCOHOL AND METHYL METHACRYLATE AND USES THEREFOR
Harold Kirkwood Inskip, Tonawanda, N.Y., and Robert Leonard Adelman, Wilmington, Del., assignors to E. I. du Pont de Nemours and Company, Wilmington, Del.
No Drawing. Filed July 15, 1969, Ser. No. 842,020
Int. Cl. C08f 15/26
U.S. Cl. 260—86.1
3 Claims

ABSTRACT OF THE DISCLOSURE

A copolymer of vinyl alcohol and methyl methacrylate is provided which possesses properties making it suitable for a number of uses with a proper balance of gel resistance and water sensitivity realized when the methyl methacrylate content is between about 3.5 and 5 percent by weight. In uses where gel resistance is not important the methyl methacrylate content can be as low as 2 percent. For textile warp sizing applications, particularly for polyester/cotton blends heat-set in the greige, the methyl methacrylate content can be slightly higher than 6 percent, i.e., up to 6.5 percent.

BACKGROUND OF INVENTION

Field of invention

This invention relates to copolymers of vinyl alcohol and methyl methacrylate and uses therefor.

Prior art

Polyvinyl alcohol has been available as an article of commerce for many years and has been found useful in unsupported films, fibers, sizes and adhesives, as emulsifiers and thickeners, and in many other diverse applications. The properties of polyvinyl alcohol can be varied, most importantly by varying its molecular weight or its degree of hydrolysis. Many grades are offered commercially to permit the user to select the one best suited to his use.

Illustrative of properties that change with increasing molecular weight are an increase in solution viscosity and film strength and a decrease in rate of solution. Degree of hydrolysis has a profound effect on properties. Polyvinyl alcohol which is about 88 percent hydrolyzed is soluble in both hot and cold water, and its concentrated aqueous solutions do not change appreciably in appearance or viscosity during prolonged storage at room temperature. In contrast, polyvinyl alcohol which is greater than 99 percent hydrolyzed is soluble in hot water, but not cold water, and its concentrated aqueous solutions have relatively poor storage stability at room temperature, first exhibiting an increase in viscosity and finally becoming gelatinous. Intermediate between these, polyvinyl alcohol which is about 98 percent or a little less hydrolyzed is soluble in hot water and insoluble in cold water. Its concentrated aqueous solutions exhibit relatively good storage stability at room temperature and it is termed "gel resistant."

It is known that polyvinyl alcohol can be prepared from a variety of polyvinyl esters and from several polyvinyl ethers, but the only commercially important precursor is polyvinyl acetate. Also, while polyvinyl acetate can be converted to polyvinyl alcohol in a variety of ways (e.g., ammonolysis, saponification with aqueous alkali metal hydroxides, acid catalyzed hydrolysis, acid catalyzed alcoholysis and base catalyzed alcoholysis), base catalyzed methanolysis appears to be the only important commercial process.

When polyvinyl acetate dissolved in methanol is treated with a strongly basic catalyst such as sodium methoxide, methanolysis commences immediately forming vinyl alcohol units in the polymer and methyl acetate as a by-product. During the initial portion of the reaction, no change in the appearance of the solution is observed; but, as the degree of alcoholysis approaches 40 to 50 percent, the viscosity begins to rise rapidly, and the solution gels. Heavy-duty mixing equipment is required to maintain good mixing, and then as the alcoholysis proceeds further, to break down the gel into discrete particles. When the alcoholysis has proceeded to the desired degree, the basic catalyst is neutralized and the product isolated. For many years, nearly all commercial polyvinyl alcohol was manufactured in this manner.

The basic process is relatively expensive, since the heavy-duty equipment is costly and throughput rates are low. As time passed, a number of continuous processes were developed which by permitting higher production rates have lowered manufacturing costs. Some of these are of a so-called "plug flow" nature such that all increments of the total mixture have essentially the same holdup time in the alcoholysis reaction zone. For example, the polyvinyl acetate in methanol solution is mixed rapidly and continuously with sodium methoxide in methanol solution and the mixture spread out quickly as a thick film on a moving belt. After a given period, the thick film of polyvinyl alcohol which forms is neutralized, broken into a useful particle size and isolated. The alcoholysis can be run to any desired degree and all increments of the reacting mixture will have the same holdup time.

Another type of continuous alcoholysis process which involves the use of ordinary and far less expensive equipment is that described in U.S. Pat. 2,734,048 issued to John E. Bristol and Walton B. Tanner on Feb. 7, 1956. In this process, solutions of polyvinyl acetate in methanol and sodium methoxide in methanol are fed continuously to the first of two or more simple agitated vessels. Rates and compositions are selected so that only a small amount of polyvinyl acetate is present at any time with most of the polymer being present as polyvinyl alcohol of varying degree of hydrolysis. The contents of the first vessel overflow into a second vessel where the alcoholysis is nearly completed. This process makes it possible to avoid the gel state; however, this process does suffer from the fact that extensive backmixing occurs. Thus, a sample taken from either vessel at a given time will contain particles having a broad residence time distribution and, thus, having different degrees of hydrolysis. The only practical way to produce a product having a narrow degree of hydrolysis distribution by this process is to force the reaction close to completion so that essentially all of the particles are nearly completely hydrolyzed.

The first-described continuous process enables manufacturers to produce all commercial grades of polyvinyl alcohol required by the user, while the second continuous process has only been useful for producing the fully hydrolyzed grades. Therefore, there is a need to produce grades of polyvinyl alcohol by the second continuous process, which is less expensive to conduct, and which will have properties enabling them to compete with many of the present grades of polyvinyl alcohol.

Various vinyl alcohol copolymers, such as vinyl alcohol and acrylic ester copolymers described in U.S. Pat. 2,290,600 issued to Harry T. Neher and LaVerne N. Bauer on July 21, 1942, and Canadian Pat. 569,991 have been disclosed in the art at widely varying vinyl alcohol contents. However, there has not been described in the art a vinyl alcohol copolymer possessing a balance of useful vinyl alcohol polymer properties, i.e., gel resistance and water sensitivity, enabling it to replace many grades of polyvinyl alcohol.

SUMMARY OF INVENTION

According to the present invention there is provided a copolymer of vinyl alcohol comprising about 94 to 98 percent by weight vinyl alcohol and about 6 to 2 percent by weight methyl methacrylate, said copolymer being essentially free of acid.

Uses of the copolymer are also provided. These uses are as a textile warp-sizing composition, especially for polyester and cotton blends and textile fabrics and yarns sized with the sizing composition.

DETAILED DESCRIPTION OF INVENTION

The vinyl alcohol/methyl methacrylate copolymer of the present invention is prepared by methods known to the art. For example, a particularly preferred process is described in copending application Ser. No. 805,203, filed Mar. 7, 1969 by Blumberg et al. and assigned to the assignee of the present application, now U.S. Pat. 3,513,142.

In the process described, a stream of vinyl acetate (VAc), methyl methacrylate (MMA) and methanol solvent is purged with an inert gas such as nitrogen. An initiator solution, e.g., 2,2'-azobisisobutyronitrile dissolved in methanol, is combined with the above feed stream and the combined streams are passed directly and continuously into the polymerizer from which a stream of the polymerization mixture is continuously withdrawn. Oxygen or air should, of course, be excluded during the polymerization and this can be effectively done by employing a continuous polymerizer provided with reflux condenser whereby, when the polymerization is effected continuously under reflux conditions, the polymerizer in effect becomes a system closed from the atmosphere.

The polymerization of the vinyl acetate and methyl methacrylate from which dissolved oxygen has been purged may be effected at temperatures ranging from 55 to about 150° C., the preferred temperatures being in the range 60 to 95° C. Temperatures lower than about 55° C. are insufficiently high to effect the thermal production of free radicals from the commonly used polymerization initiators and, therefore, are insufficiently high to cause the polymerization to proceed at practical rates. Temperatures higher than about 150° C. are not particularly advantageous and, therefore, seldom will be employed. At temperatures within the above range, and particularly at those temperatures within the preferred range, polymerization will proceed rapidly and with excellent results. Since the polymerization reaction is exothermic, the reaction is effected under reflux and/or with the aid of cooling means such as a cooling jacket for the polymerizer in order to control the temperature at the desired level. Pressure does not appear to be particularly important except that the pressure should be sufficient to maintain the polymerization mixture in the liquid phase. Ordinarily, pressures of 1 to 5 atmospheres, preferably 1 to 2 atmospheres, are satisfactory.

While the polymerization may be effected employing a non-aqueous, i.e., less than about 0.5 weight percent water, monomer stream which is free of any added solvent or diluent, the monomer feed stream most generally will be a substantially anhydrous solution of the mixtures of monomers in a solvent such as a 1 to 4 carbon aliphatic alcohol. Other solvents which are inert to the polymerization initiator to be employed, i.e., will not inactivate the same, may also be used. Examples of such other solvents are methyl acetate, ethyl acetate, and the like. However, the preferred solvents are the above alcohols, the most preferred of which is methanol. Unpolymerized vinyl acetate is removed from the vinyl acetate/methyl methacrylate copolymer solution effluent from the polymerizer in a stripping column in which methanol vapor is employed as the stripping agent. There will generally be added to the polymerizer effluent a polymerization inhibitor such as hydrazine, sulfur or methyl nitrite, or the like, prior to the passage of the effluent stream into the stripping column. The purpose of the inhibitor is to prevent polymerization occurring in the stripping column. The overhead fraction from the stripping column consisting of unpolymerized vinyl acetate, methyl methacrylate and methanol may be passed to a distillate recovery system. Preferably, it is recycled to the polymerizer via the packed purging column after the feeding thereto of make-up vinyl acetate and methyl methacrylate monomers. The bottom effluent from the stripping column will be a solution of vinyl acetate/methyl methacrylate copolymer in methanol. This normally will be passed directly to the alcoholysis system, particularly when the hydrolytic alcohol to be employed in the alcoholysis is methanol, as will usually be the case.

In effecting the polymerization, the temperature in the polymerizer, the rate of monomer feed, the solvent concentration and the residence time of material in the polymerizer will generally be such that the content of the monomers of the reaction mixture in the polymerizer will range from around 5 to 80 percent by weight. However, at any given temperature, polymerization rate and solvent concentration, the monomer content of the mixture will generally be controlled in accordance with the desired molecular weight of the vinyl acetate/methyl methacrylate copolymer intermediate; the higher the concentration of monomers in the mixture, the higher will be the molecular weight of the resulting copolymer.

Any free radical-type initiator which is soluble in the polymerization mixture and which has the desired half-life at the temperature to be used may be employed in effecting the polymerization, examples of which are the organic peroxides such as benzoyl peroxide, diacetyl peroxide, secondary butyl percarbonate and isopropyl percarbonate, and the azo compounds such as 2,2'-azobisisobutyronitrile. The concentration of such initiator in the polymerization mixture will generally range from 0.001 to 1 percent by weight, the preferred concentrations being 0.02 to 0.5 percent. Such initiators are effecttive at the temperatures previously indicated.

Generally, the amount of the methyl methacrylate employed with the vinyl acetate monomer to produce the copolymers will be limited so as to yield a hydrolyzed copolymer containing about 2 to 6 percent, preferably about 3.5 to 5 percent, of the methyl methacrylate. Such copolymers can be readily alcoholyzed by conventional alcoholysis methods to yield polyvinyl alcohol products. However, to prepare the copolymer products of the present invention essentially free of acid and in which only the acyloxy portion of the vinyl acetate component is replaced wholly or partially by hydroxyl groups, basic alcoholysis should be employed.

The alcoholysis of the intermediate vinyl acetate and methyl methacrylate copolymer may be effected by any of the well-known procedures for effecting the catalyzed alcoholysis of such intermediates. Although the method of effecting the preparation of the vinyl acetate and methyl methacrylate copolymer intermediate under continuous polymerization conditions is preferred, the alcoholysis of such intermediates may be effected either batchwise or continuously.

The patent literature describes various batch and continuous methods for the production of polyvinyl alcohols by the catalytic alcoholysis of polyvinyl esters. These methods are applicable to the vinyl acetate and methyl methacrylate copolymer. These include the batch method of U.S. Pat. 2,227,997 issued to Herbert Berg on Jan. 7, 1941, wherein the liquid and solid constituents of the reaction mixture are proportioned so as to produce a plastic mass which is kneaded during the course of the reaction. Another method is that of U.S. Pat. 2,642,419 issued to G. P. Waugh on June 16, 1953, wherein the reactants are continuously mixed, the mixture is poured or cast onto a moving surface, e.g., of a belt conveyor, where gelling occurs, and the gel is removed from that surface and comminuted before syneresis occurs.

The continuous method of U.S. Pat. 2,734,048 issued to John E. Bristol and Walton B. Tanner on Feb. 7, 1956, involves the continuous feeding of a polyvinyl ester solution to an agitated alcoholysis reaction mixture at such a rate that the concentration of soluble polyvinyl ester (0 to 45 percent alcoholyzed) therein does not exceed about 1 percent, whereby gel formation is avoided and the polyvinyl alcohol is obtained as a slurry which does not require the use of heavy mixing equipment such as kneaders. A more recent method for the continuous production of polyvinyl alcohol in granular form is that of U.S. Pat. 3,296,236 issued to Walton B. Tanner on Jan. 3, 1967. In that method, at least a portion of the feed of the polyvinyl ester solution in the hydrolytic alcohol is fed to the agitated catalyzed reaction mixture in intermittent portions of such size that the mixture thickens as each portion passes through a gel phase, with the interval between succeeding intermittent portions being such that the alcoholysis mixture reverts to a nonthickened condition after each portion passes through the gel phase. A slurry of the granular polyvinyl alcohol in a solvent mixture of the hydrolytic alcohol and the by-product ester, e.g., methyl acetate, is continuously withdrawn as product.

Other U.S. patents relating to the alkali catalyzed alcoholysis of polyvinyl esters are 2,266,996 issued to Norman D. Scott and John E. Bristol on Dec. 23, 1941; 2,464,290 issued to Griffith Bowen on Mar. 15, 1949; 2,481,388 issued to Harold W. Bryant on Sept. 6, 1949; 2,605,259 issued to Leo M. Germain on July 29, 1952; 2,700,035 issued to John E. Bristol on Jan. 18, 1955; and 2,290,251 issued to Robert S. Weisz on Aug. 23, 1960. In general, these patents relate to effecting the alkali catalyzed alcoholysis under special conditions such as the use of particular catalysts, and the use of particular temperatures. Any of the methods of these patents may be practiced in carrying out the alcoholysis step of the present invention. Since the methods of all of the foregoing patents are well-known, details thereof will not be specifically set forth, but the disclosures of the patents are incorporated herein by reference.

In general, the alcoholysis reaction will be effected using methanol or ethanol, preferably the former, as the hydrolytic alcohol at temperatures ranging from 20 to 100° C., but most preferably 40 to 65° C. The pressure should, of course, be sufficient to maintain liquid-phase conditions at the desired temperature for the reaction, and pressures from atmospheric to two or more atmospheres of pressure or higher can be used.

The hydrolytic alcohol should be substantially anhydrous, by which is meant that the alcohol will contain not more than 1 percent, and preferably not more than 0.2 percent water. The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from around 40 to 90 percent, preferably 50 to 70 percent, of the weight of the alcoholysis reaction mixture. Conversely, the solids content will generally be 10 to 60 percent, preferably 30 to 50 percent, of the reaction mixture.

The by-product of the alcoholysis reaction will be methyl acetate. Such ester can be removed as formed during the alcoholysis or allowed to build up in the alcoholysis medium.

The alcoholysis catalyst can be any of the alkaline catalysts that are effective in catalyzing the alcoholysis such as the alkali metal hydroxides and the alkali metal alcoholates. The alcoholate catalysts, particularly sodium methylate, are especially preferred. The catalyst concentration in the alcoholysis mixture may range from around 0.05 to 5 percent by weight, but preferably will be about 0.1 to 1 percent, of the weight of the alcoholysis mixture.

The vinyl alcohol/methyl methacrylate copolymer of the present invention has a good balance of gel resistance and water sensitivity at methyl methacrylate contents between about 3.5 and 5 percent by weight. This balance is not attainable with a single homopolymer grade of polyvinyl alcohol made by the above-described second continuous process. It is essential that the copolymer be essentially free of acid, preferably completely free of acid, to minimize undesirable cross-linking reactions which occur at elevated temperatures. It also has a residual vinyl acetate content of less than 0.5 mole percent. When a basic alcoholysis catalyst is employed, some of the methacrylate groups may react with some of the neighboring hydroxyl groups to form lactone groups. Thus, the copolymer finds uses where many commercial grades of polyvinyl alcohol are used.

A particularly preferred use of the copolymer is as a textile yarn warp-sizing agent and is particularly advantageous in sizing warp yarns of polyester/cotton blends that are heat-set in the greige. The copolymer is used as a textile warp-sizing composition by dissolving the copolymer in water. The content of the copolymer in water is usually from about 4 to 12 percent by weight. The sizing composition can additionally contain other materials commonly found in such compositions. Such materials are waxy-type lubricants and defoamers. Low melting (below 66° C.) emulsifiable waxes are the preferred lubricants and are incorporated into the formula at a level of 3 to 5 percent on the weight of copolymer used. The preferred type of defoamers are low ethylene oxide adducts of linear alcohols or alkyl phenols. The quantity needed will usually be between 0.05 percent and 0.25 percent based on the weight of solution depending upon the amount of foaminess encountered.

In the weaving of cloth, it is customary to size the yarn to impart the necessary strength and provide surface protection for the yarn so that it can withstand the severe mechanical actions of the loom as well as the rubbing or chafing caused by adjacent yarns. The need for surface protection is especially important in the case of spun yarns. In contrast with filament yarns which have a relatively smooth surface, spun yarns are composed of short fibers twisted together into a uniform mass to become a yarn. The twist of the yarn is the only thing which holds the fiber bundle together. In addition, in spun yarns there is a great profusion of individual fibers protruding from the yarn itself which gives the yarn a very hairy surface appearance. As a result, one of the main functions of a size for spun yarns is to coat the yarn and thereby lay or plaster down the hairy surface of the yarn. For filament yarn warp sizing, the main function is for the size to penetrate the fiber bundle to adhere the individual filaments together.

Another important requirement for a suitable warp size is easy and complete removal in the finishing plant before other treatments such as mercerizing, bleaching, dyeing and finishing are carried out.

Polyvinyl alcohol, especially the completely hydrolyzed grades, have been finding increasing use in warp sizing. This increased consumption has resulted from the rapid growth of synthetics and synthetic/natural fiber blends which require sizing materials with greater adhesion, especially to the synthetic hydrophobic fibers, than obtainable with starch base sizes. The vinyl alcohol/methyl methacrylate copolymer possess properties essential to an ideal warp size for natural and synthetic yarns. It has excellent adhesion to both hydrophobic and hydrophilic fibers and yarns, protecting them with a strong, flexible, abrasion-resistant coating. These characteristics allow for low add-on (about 3 to 12 percent based on the weight of untreated yarn) so weaving performance of yarns sized with copolymer is excellent. The greige goods are high in quality, flexible and smooth, with minimum defects caused by loom stops and yarn breaks. Since the copolymer is water-soluble, it can be removed from the greige fabric with hot water (66–77° C.) in standard open-width or rope washers.

The solubility of polyvinyl alcohol in water is attributable to its high polarity and to the large number of hydroxyl groups in the polymer chain. These hydroxyl groups also confer upon polyvinyl alcohol its unique physical properties as compared with other water-soluble polymers. Their affinity for one another results in large interchain molecular forces which contribute to high strength and toughness. In addition, polyvinyl alcohol is known to crystallize, and this also contributes to high strength and toughness. The substitution of bulkier groups such as the acetate group for hydroxyls, as in the partially hydrolyzed grades of polyvinyl alcohol, inhibits the close packing of the molecules (less interchain attraction) and minimizes the tendency to form crystallites. The more closely packed, the more difficult it is to dissolve polyvinyl alcohol in water. This is manifested in the higher temperature required to dissolve polyvinyl alcohol. The copolymer of the invention, on the other hand, readily dissolves, but is not too water sensitive.

The crystallinity of polyvinyl alcohol or other crystalline polymers can be increased by orientation or annealing. Heating of polyvinyl alcohol at elevated temperatures near its crystalline melting point (ca. 220–230° C.), and cooling slowly also increases the degree of crystallinity.

The tendency of completely hydrolyzed grades of polyvinyl alcohol to crystallize and become difficult to dissolve when heated at elevated temperatures has created problems in the finishing mills. A large outlet for this polyvinyl alcohol is as a warp size for spun polyester/cotton blend yarn. There is a tendency in the finishing mills to heat-set the polyester/cotton fabric in the greige state to relieve internal stresses of the polyester fiber and remove residual shrinkage. The heat-setting conditions vary as regards temperature and time, but the temperature used generally ranges from about 195 to 230° C. and the time from 5 seconds to a minute or longer. When this is done, the polyvinyl alcohol film on the fibers first becomes dehydrated and extremely difficult to dissolve in water due to an increase in crystallinity. While techniques have been developed to remove polyvinyl alcohol from heat-set fabric, it has been the goal to develop a size which can be more easily and completely removed using conditions commonly employed in the finishing mills. The vinyl alcohol/methyl methacrylate copolymer meets this goal.

In Examples 1–12 which follow which were conducted at atmospheric pressure, i.e., 1, 2, 6, 12 and control, the polymerizer employed was a 1.5-liter jacketed resin flask fitted with an agitator, a condenser, a nitrogen inlet, a feed control system and a level control system. The other examples were conducted in a pressurized autoclave as described in Example 3. The comonomers and the solvent in the desired ratios (No. I feed) were placed in one reservoir and fed by gravity to the polymerizer through a valve. An identical mixture of comonomers and solvent containing a small amount of initiator (No. II feed) were placed in a second reservoir and fed to the polymerizer at a fixed rate through a metering pump. Both feeds were sparged continuously with nitrogen in the reservoirs. Hot water was circulated through the jacket to bring the polymerizer contents to the reflux temperature. A sensing probe near the top of the polymerizer activated a valve connected to the polymerizer drain and maintained a constant level in the vessel. The product solution leaving through the drain valve flowed into a reservoir containing an inhibitor (usually hydrazine acetate) to prevent further polymerization.

The agitator, which was a series of pitched blades mounted to a shaft at different levels, operated through a system which indirectly recorded the viscosity of the polymerizer contents. As the viscosity of the polymerizer contents reached a predetermined set point, indicating the desired conversion of monomers to polymer had been achieved, the valve in the No. I feed system opened and permitted this initiator-free feed to enter. This in turn lowered the viscosity slightly and the valve was then closed until the viscosity again reached the set point. Conversions were also determined gravimetrically at intervals to confirm the instrument readings.

In Examples 1, 2, 6, 12 and control the holdup level in the polymerizer was about 1200 grams, and the sum of the No. I and No. II feed rates was about 14 grams/minute corresponding to an average holdup time of about 1.4 hours.

The invention will be further illustrated by the following examples in which parts and percentages are by weight unless otherwise indicated.

EXAMPLE 1

In the glass polymerization vessel described above was placed 600 grams of the No. I feed composed of 89.3% of vinylacetate, 0.7% of methyl methacrylate and 10% of methanol and 300 grams of the No. II feed composed of the No. I feed plus 2% of azo-bis-isobutyronitrile as initiator. The vessel was flushed with nitrogen, and hot water was passed through the jacket to bring the mixture to gentle reflux. After about one hour the percent solids of the vessel contents reached 25. The vessel was then cooled to below room temperature overnight then reheated to the reflux temperature (59° C.) the following morning. Steady state conditions were reached in about two and one-half hours, during which period the initiator concentration in the No. II feed was reduced from 2 to 1%, and the polymerization was continued for an additional 10 hours with one additional overnight shutdown. Steady state solids averaged 33.5%, and the average feeds were 11.5 ml./min. of No. I and 3.6 ml./min. of No. II.

Prior to the alcoholysis, the polymerizer effluent was placed in a column and freed of unpolymerized vinyl acetate by introducing methanol vapors at the bottom and removing methanol and vinyl acetate vapors overhead. This stripping operation was continued until the vinyl acetate concentration was less than 0.05%; yielding a methanol solution containing about 35% of the copolymer.

The alcoholysis was then performed by feeding this polymer solution and a second solution containing about 10% of sodium methylate in methanol to the first of two stirred resin flasks in series. The temperature was controlled at about 55° C., and enough sodium methylate solution was fed to maintain a concentration of 0.4% sodium methylate in the vessel. At startup, a heel of a 50/50 mixture of methanol and methyl acetate containing 0.4% sodium methylate was employed. The slurry of polyvinyl alcohol in methanol and methyl acetate which formed, and which contained up to about 1% of polyvinyl acetate or only partly alcoholyzed polyvinyl acetate, overflowed into the second vessel, where the additional holdup time permitted the reaction to approach completion. The overflow from the second vessel was then held hot and alkaline in the receiver for about 30 minutes to complete the reaction. The alkaline catalyst was then neutralized with acetic acid. The product was collected on a Buchner filter, washed with about an equal volume of methanol and then dried overnight in a vacuum oven at 65° C. Properties of the alcoholyzed copolymer are described in Table II.

EXAMPLE 2

This copolymerization was carried out in the same manner as that described in Example 1 except that the No. I feed contained 81.3% of vinyl acetate, 0.7% of methyl methacrylate and 18.0% of methanol, and the No. II feed was the same with an added 1.5% of azo-bis-isobutyronitrile. At steady state, the average solids content was 36.0, and the average feeds were 9.9 ml./min. of No. I and 5.5 of No. II. Analysis of a sample of the polymerizer contents at steady state by gas chromatography showed that less than 0.02% of methyl methacrylate was present as compared with 0.7 weight percent in the feeds. Properties of the alcoholyzed copolymer obtained are given in Table II.

EXAMPLE 3

This copolymerization was carried out in a one-gallon stainless steel autoclave in the general manner described in Example 1 except that the No. I feed was composed of 89.2% of vinyl acetate, 0.8% of methyl methacrylate and 10.0% of methanol, the No. II feed was the same plus an added 0.1% of azo-bis-isobutyronitrile, and nitrogen was employed to give a reaction pressure of 10 p.s.i.g., and the temperature was 75° C. The average solids content at steady state was 37%, the average feed rates were 6.5 ml./min. of No. I and 9.5 ml./min. of No. II and the holdup level was about 1800 grams of solution. Properties of the alcoholyzed copolymer obtained are described in Table II.

EXAMPLES 4–12

Conditions employed in the preparation of an additional group of vinyl acetate/methyl methacrylate copolymers by these general methods are summarized in Table I. Properties of the alcoholyzed copolymers obtained are described in Table II.

The swatches were then given a heat-setting treatment by placing them in an electrically heated forced convection air oven maintained at an air temperature of 195° C. for a period of 1 minute.

The swatches were next desized by either a short or long dip in various wash solutions. The short dip differed from the long dip only in that the former had a total elapsed time of 1 minute and 40 seconds to 1 minute and 50 seconds to complete the wash cycle while the latter had an elapsed time of 3 minutes for the same cycle. The cycle consisted of first a 10 second dip in a 0.2% solution of "Alkanol" WXN (sodium lauryl sulfate) followed by three 10 second dips in different beakers of water; all the wash baths were run at 66° C. with the swatches being passed through the wringer at 100 lb./linear inch between each wash. Following the wash cycle, the swatches were again dried at 110° C. for two hours and weighed. From the weights, the percent removal of polyvinyl alcohol was calculated.

Following the last weighing, complete removal of the polyvinyl alcohol was then attempted by boiling the swatches in water for two hours, again followed by drying at 110° C. for two hours and weighing. The results are shown in Table III.

It is apparent that the methyl methacrylate copolymers are easier to remove than the fully hydrolyzed polyvinyl TABLE I.—COPOLYMERIZATIONS OF VINYL ACETATE (VAc) AND METHYL METHACRYLATE (MMA)

| | Polymerization | | Feed composition (weight percent) | | | Feed rate (ml./min.) | Initiator [1] (weight percent on total feed) | Percent solids |
|---|---|---|---|---|---|---|---|---|
| | Temp (° C.) | Pressure (p.s.i.g.) | VAc | MMA | MeOH | | | |
| Examples: | | | | | | | | |
| 4 | 74 | 6 | 94.3 | 0.7 | 5 | 15.0 | 0.029 | 31.0 |
| 5 | 76 | 10 | 89.3 | 0.7 | 10 | 15.4 | 0.031 | 34.0 |
| 6 | 59 | 0 | 82.8 | 1.2 | 16 | 15.0 | 0.67 | 35.5 |
| 7 | 77 | 10 | 90.8 | 1.2 | 8 | 15.5 | 0.058 | 36.5 |
| 8 | 77.5 | 10 | 91.0 | 1.0 | 8 | 16.1 | 0.044 | 35.7 |
| 9 | 77.5 | 10 | 90.2 | 0.8 | 9 | 23.0 | 0.040 | 36.0 |
| 10 | 76 | 10 | 87.4 | 0.6 | 12 | 22.4 | 0.050 | 37.1 |
| 11 | 73.5 | 6 | 94.25 | 0.25 | 5 | 22.0 | 0.061 | 30.8 |
| 12 | 58 | 0 | 84.5 | 0.5 | 15 | 15.7 | 0.39 | 36.3 |
| Control | 57 | 0 | 84.12 | 0.7 [2] (0.18) | 15 | 15.0 | 0.43 | 35.0 |

[1] Azo-bis-isobutyronitrile employed in all examples except No. 6 in which sec-butyl percarbonate was employed.
[2] Percent acrylic acid.

TABLE II.—PROPERTIES OF VINYL ALCOHOL/METHYL METHACRYLATE COPOLYMERS [1]

| | Viscosity, 4% H₂O soln. at 20° C. (cps.) | Weight percent MMA in vinyl alcohol copolymer [2] | Saponification Number | |
|---|---|---|---|---|
| | | | Calculated [2] | Found |
| Example: | | | | |
| 1 | 53.0 | 4.0 | 28.0 | 28.5 |
| 2 | 23.4 | 3.7 | 26.5 | 26.1 |
| 3 | 24.3 | 4.1 | 28.8 | 30.8 |
| 4 | 62.0 | 4.3 | 29.7 | 27.2 |
| 5 | 33.0 | 3.9 | 27.4 | 27.6 |
| 6 | 21.6 | 6.4 | 41.4 | 40.4 |
| 7 | 23.4 | 6.3 | 40.9 | 42.8 |
| 8 | 27.9 | 5.3 | 35.4 | 38.5 |
| 9 | 30.8 | 4.2 | 29.4 | 30.4 |
| 10 | 25.8 | 3.1 | 23.0 | 25.4 |
| 11 | 50.0 | 4.6 | 31.6 | 30.2 |
| 12 | 30.4 | 2.7 | | 21.8 |
| Control | 30.4 | [3] 3.8 | | 21.8 |

[1] The copolymers (except Control) all have zero acid content and a residual vinyl acetate content <0.5%.
[2] Calculated on the basis that all of the methyl methacrylate in the feed was incorporated in the polymer and that the balance, percent solids-percent MMA, was polymerized vinyl acetate, and that 0.5% of the acetate groups in the copolymer were not removed during alcoholysis.
[3] 1% Na acrylate.

EXAMPLE 13

Using the vinyl alcohol/methyl methacrylate copolymers prepared in Examples 1–12 and commercially available polyvinyl alcohols as controls, tare weighted cotton cloth swatches (80 x 80 desized and bleached fabric from Test Fabrics, Inc.) were saturated with 8% solutions of the various vinyl alcohol polymers.

The swatches were passed through a motor driver wringer at a pressure of 100 lb./linear ft. to remove the excess solution and then the impregnated swatches were dried at 110° C. for 2 hours and the swatches weighed.

alcohols and approach or equal the medium molecular weight, partially hydrolyzed copolymers.

TABLE III.—REMOVAL OF VINYL ALCOHOL POLYMERS FROM HEAT-SET, SIZED COTTON CLOTH

| Polyvinyl alcohol | Add-on, percent | Dip time, sec. | Desized, percent removed | Total removal, percent after scour |
|---|---|---|---|---|
| PVA (visc.-60, 99.3% hydrolyzed) | 12.7 | 100 | 7.5 | 73.6 |
| PVA (1/1 mixture of high visc. 99.3% hydrol. and low visc. 88% hydrol. visc.-17) | 7.7 | 100 | 34.7 | 88.0 |
| VOH/MMA: | | | | |
| Example 1 | 9.4 | 100 | 51.4 | 97.9 |
| Example 2 | 5.4 | 100 | 49.0 | 103.0 |
| Example 4 | 10.4 | 100 | 44.0 | 96.9 |
| Example 5 | 9.0 | 100 | 60.0 | 99.2 |
| Example 6 | 7.5 | 100 | 57.1 | 95.6 |
| Example 3 | 8.2 | 100 | 44.0 | 97.7 |
| PVA (visc.-60, 99.3% hydrolyzed) | 12.8 | 360 | 1.4 | 98.0 |
| PVA (1/1 mixture of high visc. 99.3% hydrol. and low visc. 88% hydrol. visc.-17) | 8.7 | 360 | 36.0 | 103.0 |
| VOH/MMA: | | | | |
| Ex. 1 | 11.2 | 360 | 46.4 | 100.0 |
| Ex. 2 | 5.8 | 360 | 44.2 | 100.0 |
| Ex. 4 | 10.4 | 360 | 50.0 | 102.0 |
| Ex. 5 | 10.1 | 360 | 53.4 | 105.0 |
| Ex. 6 | 7.5 | 360 | 76.3 | 105.0 |
| Ex. 3 | 6.8 | 360 | 72.1 | 107.0 |
| Ex. 7 | 8.0 | 110 | 64.6 | |

EXAMPLE 14

This example illustrates the removability advantage for sizes based on vinyl alcohol/methyl methacrylate copolymer versus completely hydrolyzed medium viscosity polyvinyl alcohol from heat-set greige polyester/cotton fabric:

(A) Two 1500 yard beams of spun 50/50 polyester/cotton yarn, 25 singles, were sized at a textile mill using conventional slashing equipment at a speed of 95 yards/minute. One beam was sized using a 7.5% solution of a medium viscosity, completely hydrolyzed polyvinyl alcohol (PVA) while the other beam was sized using 6.5% solution of a medium viscosity 95.8/4.2 vinyl alcohol/methyl methacrylate copolymer (PVA/MMA) made under the conditions of Example 9. The number of ends in each beam were 5376. The size add-on was found to average 9.3% for the polyvinyl alcohol-sized yarn and 7.0% for the copolymer sized yarn.

The two sized warps were then woven into a 2/1 twill fabric, 112 x 52 construction, using 50/50 polyester/cotton yarn, 25 singles, as the fill yarn. Both warps wove well with weaving efficiencies in the order of 95% in both instances.

After weaving, a part of each fabric was heat-set in the greige at 195° C. for one minute for use in desizing experiments. The desizing experiments were carried out as follows: Samples of fabric 6 inches square were dried to constant weight by heating in an oven for at least 4 hours. Each sample was then subjected to 3 ten-second washes in water at the designated temperature, being squeezed dry after each wash and then dried to constant weight in an oven. The amount of size removed was determined from the loss in weight during washing. The following table summarizes the results of the desizing experiments using the heat-set fabric.

| Size | Percent size removed at— | | |
|---|---|---|---|
| | 49° C. | 66° C. | 82° C. |
| PVA | 17 | 20 | 23 |
| PVA/MMA | 22 | 80 | 96 |

These results show that the PVA/MMA copolymer is more readily removed than polyvinyl alcohol from fabric which has been heat-set in the greige.

(B) Also compared was the removal of the PVA/MMA copolymer and polyvinyl alcohol sizes from both non-heat set and heat-set fabric using a technique now used commercially to desize heat-set polyvinyl alcohol sized polyester/cotton fabrics. This technique involves padding the fabric with a 1% solution of a rewetting agent ("Alkanol" WXN sodium lauryl sulfate), steaming for 1 minute and then 3 wash boxes at 66° C.

| Size | Percent size removed | |
|---|---|---|
| | Non-heat set | Heat set |
| PVA | 100 | 91.9 |
| PVA/MMA | 100 | 96.8 |

The above data show that the PVA/MMA copolymer size is more readily removed from heat-set fabric than is the polyvinyl alcohol even though both come off quantitatively from non-heat fabric under the same conditions.

(C) Also compared were the removal properties of the PVA/MMA copolymer and polyvinyl alcohol as the heat-setting temperature is raised.

| Fabric | Size | Percent removal after heat setting for 1 minute at— | | |
|---|---|---|---|---|
| | | 195° C. | 204° C. | 216° C. |
| Poplin—92 x 60 | PVA/MMA | 85.7 | 90.3 | 90.7 |
| Do | PVA | 87.0 | 85.7 | 83.2 |

The desizing cycle used was the same as in Example 14B.

(D) This procedure compares the removal properties of the PVA/MMA copolymer and polyvinyl alcohol sizes under various conditions used in a commercial finishing plant.

Desize Process I:

(A) Heat-set 50 seconds—204° C.
(B) Single and quench—60° C.—0.7% rewetting agent ("Alkanol" WXN)
(C) Steam-Roller—17 seconds
(D) Wash—59° C.—3 boxes—35 g.p.m.

Desize II:
Same as I except not steamed.

Desize Process III:
Same as I except non-heat-set fabric and not steamed.

PERCENT SIZE REMOVAL

| | Desize process | | | | | |
|---|---|---|---|---|---|---|
| | I | | II | | III | |
| | PVA | PVA/MMA | PVA | PVA/MMA | PVA | PVA/MMA |
| Wash Box 2 | 72.8 | 76.2 | 15.8 | 24.7 | 36.2 | 73.0 |
| Wash Box 3 | 78.5 | 80.7 | 17.5 | 25.7 | 65.2 | 78.2 |

These data again show the better removal properties of PVA/MMA copolymer.

EXAMPLE 15

The following example illustrates the effect of carboxyl groups in the polymer on removal properties from polyester/cotton fabric which is heat-set prior to desizing as in Example 14A.

| Polymer | Amount on fabric, weight percent | Removal, percent |
|---|---|---|
| 95.5/4.5 PVA/MMA | 3.9 | 87.5 |
| 96.5/3.5 PVA/MMA | 3.9 | 92.2 |
| 97.3/2.7 PVA/MMA (from Example 12) | 4.0 | 93.8 |
| 95.2/3.8/1.0 PVA/MMA/AA (from Control) | 3.9 | 70.7 |

The desizing conditions consisted of padding for 10 seconds with 0.5% solution of a wetting agent, removing excess solution by passing through squeeze rolls, steaming for 1 minute and then subjecting to 3 ten-second washes using 66° C. water.

The results clearly show that the presence of acid in the polymer has a deleterious effect on the removal of the size when it is subjected to the heat treatment used to set the polyester/cotton fabric.

EXAMPLE 16

This example illustrates the better removal properties of vinyl alcohol/methyl methacrylate (96/4) copolymer over those of a commercial gel resistant polyvinyl alcohol of approximately the same molecular weight. The gel resistant properties of the latter are chiefly due to the presence of about 4% residual acetate groups in the polymer.

The fabrics used in this example were obtained by sizing 40 cc. 65/35 polyester/cotton spun yarn with each of the sizing materials and then weaving into a plain fabric with a construction of 120 x 72. After weaving, a portion of the greige fabrics was heat-set for 1 minute at 195° C. in a gas-fired oven.

A series of 3 wash tests was then carried out to compare the removal properties of the two-size candidates during the desizing operation. One series consisted of subjecting the non-heat set fabric to a varying number of washes at different temperatures and determining the extent of size removal. The heat-set fabric was used in the other two tests which differed in that in one series of tests the fabrics were given a 1-minute steam treatment prior to washing, whereas in the second series the steam treatment was omitted.

The procedure in the wash tests was as follows:

Weighed samples of fabric were padded with a 0.5% solution of a rewetting agent at 60° C., the excess solution removed by passing the treated fabric through a set of squeeze rolls and then steamed for 1 minute or allowed to stand in the air for 1 minute prior to the washing cycles. A wash cycle consisted of a 10-second immersion in water at the desired temperature followed by passage through a set of squeeze rolls. After the desired number of washes, the fabric was dried to constant weight and the amount of size removed determined.

The original amount of size on the woven fabrics before washing was determined by extracting duplicate samples of each type of sized fabric with hot water. It was found that the PVA/MMA sized cloth contained 5.2% size whereas the PVA sized cloth had 5.6% size.

The results of the various wash tests are given in the following Table IV. From the data, the better removal properties of PVA/MMA size, especially from heat-set fabric, is readily seen.

25° C. In addition, the gel resistance was tested by examining the appearance of a thin stream of the solution as it drained from a stirring rod. The water resistance of the polymers was determined by measuring the increase in area of a 2" x 3" piece of polymer film (2.0 mil thick) which had been cast from an aqueous solution and dried at 66° C. for 20 minutes and 93° C. for 10 minutes. The films were soaked in water for 1 hour and the area increase measured. The results are shown in Table V.

It is apparent that a balance of gel resistance and water resistance required in a vinyl alcohol/methyl methacrylate copolymer assumes at about 4.1% methyl methacrylate in a polymer with all the acetates fully hydrolyzed. At slightly lower levels of methyl methacrylate, i.e., under about 3.5% methyl methacrylate, the polymer solutions were gel sensitive while at higher levels, greater than about 6% methyl methacrylate, the polymers were excessively water soluble.

TABLE V.—GEL AND WATER RESISTANCE OF VINYL ALCOHOL POLYMER SOLUTIONS AND FILMS

| Polyvinyl alcohol | Viscosity at 4% sol. | Gel resistance | | | | | Water, resistance, percent area increase |
|---|---|---|---|---|---|---|---|
| | | Conc. sol., percent | Initial viscosity, cps. | Viscosity after aging, cps. | Percent change | Flow appearance | |
| A. VOH/MMA (Example 1) | 53 | 8.3 / 11.2 | 1,280 / 5,710 | 1,380 / 7,180 | +7.5 / +25.8 | Good / Fair-poor | 230 |
| B. VOH/MMA (Example 2) | 23 | 11.2 / 13.2 | 1,420 / 3,870 | 1,780 / 5,410 | +25.6 / +39.8 | Good / do | 230 |
| C. VOH/MMA (Example 4) | 62 | 8.5 / 10.5 | 2,350 / 6,030 | 2,370 / 7,210 | +.07 / +19.6 | Good / Fair | 300 |
| D. VOH/MMA (Example 5) | 33 | 11.8 / 12.6 | 4,290 / 6,280 | 4,780 / 6,740 | +11.6 / +7.2 | Fair / Poor | 180 |
| E. VOH/MMA (Example 6) | 22 | 9.1 / 16.1 | 640 / 9,000 | 800 / 11,000 | +25.0 / +22.2 | Good / do | (1) |
| F. VOH/MMA (Example 3) | 24 | 11.4 / 13.6 | 1,960 / 4,840 | 2,140 / 5,000 | +9.2 / +3.3 | Good / do | 280 |
| G. PVA (99.3% hydrol.) | 60 | 8.7 / 11.0 | 1,710 / 5,660 | 2,170 / 8,980 | +27.0 / +59.0 | Good / Very poor | 90 |
| H. PVA (97% hydrol. comm. gel resistant grade) | 24 | 11.5 / 13.6 | 2,690 / 5,220 | 2,590 / 6,600 | −3.6 / +26.6 | Good / do | 200 |
| I. PVA (97% hydrol. higher M.W. of H) | 51 | 8.3 / 11.8 | 1,240 / 6,860 | 1,560 / 8,000 | +18.4 / +16.5 | Good / do | 190 |

[1] Disintegrates.

TABLE IV.—SIZE REMOVAL FROM POLYESTER/COTTON BLEND FABRIC

| Wash conditions | Heat-set cloth—no steam | | Heat-set cloth—steamed | | Non-heat set cloth—no steam | |
|---|---|---|---|---|---|---|
| | PVA/MMA | PVA | PVA/MMA | PVA | PVA/MMA | PVA |
| 54° C.: | | | | | | |
| 1 Wash | 12.4 | 9.9 | 71.1 | 57.5 | 96.0 | 98.3 |
| 2 Wash | 21.2 | 12.0 | 80.5 | 63.5 | 97.2 | 99.3 |
| 3 Wash | 21.8 | 16.8 | 84.8 | 67.6 | 100.0 | 99.5 |
| 5 Wash | 35.0 | 19.1 | 91.5 | 75.3 | 100 0 | 100.0 |
| 66° C.: | | | | | | |
| 1 Wash | 44.9 | 15.2 | 86.5 | 66.9 | 93.5 | 93.6 |
| 2 Wash | 51.7 | 17.8 | 88.4 | 69.7 | 94.8 | 92.1 |
| 3 Wash | 58.3 | 20.5 | 88.9 | 71.6 | 97.3 | 98.0 |
| 5 Wash | 60.3 | 21.4 | 93.1 | 73.6 | 100.0 | 100.0 |
| 77° C.: | | | | | | |
| 1 Wash | 79.1 | 54.7 | 85.9 | 67.4 | | |
| 2 Wash | 87.7 | 57.7 | 89.8 | 68.1 | | |
| 3 Wash | 91.1 | 61.2 | 89.1 | 69.2 | | |
| 5 Wash | 92.7 | 61.5 | 88.8 | 69.7 | | |
| 88° C.: | | | | | | |
| 1 Wash | 76.0 | 56.3 | 87.8 | 66.1 | | |
| 2 Wash | 82.0 | 61.6 | 89.9 | 67.2 | | |
| 3 Wash | 92.0 | 67.2 | 89.4 | 69.6 | | |
| 5 Wash | 91.0 | 70.3 | 91.3 | 71.5 | | |

EXAMPLE 17

The vinyl alcohol copolymers were tested for gel and water resistance. Gel resistance of 8 to 16% aqueous solutions of the polymers was measured by aging the solutions at 5° C. for 24 hours and determining the viscosity change after rewarming to room temperature, about

What is claimed is:

1. A copolymer essentially free of copolymerized units containing carboxyl groups and having a residual vinyl acetate content of no more than 0.5 mol percent, consisting essentially of about 94 to 98 percent by weight vinyl alcohol and 6 to 2 percent by weight of methyl methacrylate prepared by a process comprising (1) continuously polymerizing under nonaqueous conditions vinyl acetate and methyl methacrylate in the presence of methanol and an initiator at a temperature of 55° to 150° C. and a pressure of from 1 to 5 atmospheres and separating any unpolymerized monomer; (2) conducting an alcoholysis reaction in methanol under substantially anhydrous conditions in the presence of a solution of sodium methylate in methanol at a temperature of 20 to 100° C. and a pressure of 1 atmosphere or more followed by neutralization of the alkaline catalyst; and (3) separating the polymer from the liquid.

2. The copolymer of claim 1 wherein the copolymer contains about 5 to 3.5 percent by weight methyl methacrylate.

3. A water-soluble film of a vinyl alcohol polymer comprising the vinyl alcohol copolymer of claim 2 cast from an aqueous solution and dried.

References Cited

UNITED STATES PATENTS

| | | | |
|---|---|---|---|
| 2,422,646 | 6/1947 | Starck et al. | 260—86.1 E |
| 2,464,290 | 3/1949 | Bowen | 260—91.3 PVP |
| 2,643,994 | 6/1953 | Germain | 260—91.3 PVP |
| 3,197,428 | 7/1965 | Siegele | 260—86.1 E |
| 3,513,142 | 5/1970 | Blumberg et al | 260—91.3 PVP |
| 2,290,600 | 7/1942 | Neher et al. | 260—86.1 |
| 3,083,172 | 3/1963 | Scott, et al. | 260—85.7 |
| 3,156,667 | 11/1964 | Martins | 260—86.1 |
| 3,409,598 | 11/1968 | Takigawa et al. | 260—86.1 |
| 3,547,858 | 12/1970 | Worrall | 260—85.7 |
| 3,442,879 | 5/1969 | Saunders et al. | 260—91.3 PV |

FOREIGN PATENTS 569,991  2/1959  Canada.

HARRY WONG, JR., Primary Examiner

U.S. Cl. X.R.

28—72; 117—138.8, 139.5, 140; 260—28.5, 29.6, 80.75, 86.1 E, 91.3 PVA